United States Patent [19]

Oishi et al.

[11] Patent Number: 4,832,285
[45] Date of Patent: May 23, 1989

[54] MAGNETIC TAPE CASSETTE

[75] Inventors: Kengo Oishi; Osamu Suzuki, both of Kanagawa, Japan

[73] Assignee: Fuji Photo Film Co., Ltd., Kanagawa, Japan

[21] Appl. No.: 494,479

[22] Filed: May 13, 1983

[30] Foreign Application Priority Data

May 13, 1982 [JP] Japan .................. 57-68715

[51] Int. Cl.⁴ .................... G11B 15/32; G11B 23/087
[52] U.S. Cl. ..................................... 242/198; 360/132
[58] Field of Search ............... 242/197, 198, 199, 200, 242/55.19 A, 204, 194; 360/132; 352/78 R, 78 C

[56] References Cited

U.S. PATENT DOCUMENTS

| | | | |
|---|---|---|---|
| 2,732,754 | 1/1956 | Foster et al. | 242/198 |
| 3,591,100 | 7/1971 | Itoh et al. | 242/55.19 A |
| 3,773,272 | 11/1973 | Wallace | 242/55.19 A |
| 3,800,322 | 3/1974 | Schoettle et al. | 242/55.19 A X |
| 4,106,724 | 8/1978 | Higashida | 242/198 |
| 4,148,443 | 4/1979 | Lundquist | 242/198 X |
| 4,288,048 | 9/1981 | Sieben | 242/198 |

Primary Examiner—Harvey C. Hornsby
Assistant Examiner—Scott J. Haugland
Attorney, Agent, or Firm—Sughrue, Mion, Zinn, Macpeak & Seas

[57] ABSTRACT

A magnetic tape cassette having a pair of tape reels each having a peripheral portion which is provided with a gear. A brake member engages with the gears to stop rotation of the reels. The brake member is slid by a tapered pin. The contact surface of a rib adapted to limit the upward movement of the brake member. The contact surface of the brake member is inclined with respect to the bottom of the cassette in such a manner as to be wider in a reel braking releasing direction.

6 Claims, 1 Drawing Sheet

MAGNETIC TAPE CASSETTE

BACKGROUND OF THE INVENTION

This invention relates to magnetic tape cassettes. In particular, it relates to a small video cassette having a slide type brake member which is adapted to stop the rotation of the tape reels in the cassette.

A conventional brake member of this type is as shown in FIGS. 1, 2, and 3. FIG. 1 is a perspective view of the brake member. FIG. 2 is a sectional view of the brake member when the cassette is stored (or not in use). FIG. 3 is a sectional view of the brake member when the cassette is in use.

As shown in FIG. 2, a brake member 1 (FIG. 1) is arranged in alignment with a brake releasing lever insertion hole 2a in the lower half 2 of the cassette. The cassette has an upper half portion 2c. The brake member 1 is biased towards reels 5 by spring 3 so that each end portion 1a of the brake member 1 engages and locks the gear 5a of the respective reel 5. Since the end portions 1a are angularly disposed when they engage each gear 5a, the gears are locked. The magnetic tape cassette is constructed as described above. Therefore, when the cassette is not in use, the reels 5 cannot turn and accordingly, the tape is not slackened or unwound. When the cassette is used, a brake releasing bar 6, shown in FIG. 3, having a tapered insertion end is inserted into the brake member from the video deck, so that the brake member 1 is moved away from the reels 5 while sliding on the inner wall of the upper half of the cassette 2c. As a result, the reels 5 are unlocked.

As is apparent from the above description, in the conventional magnetic tape cassette, the brake releasing bar 6 is inserted into the brake member through the brake releasing bar insertion hole 2a of the lower half 2, so that the brake member 1 is slid while being pushed upwardly. However, sometimes the brake member 1 has play associated with it, or slides unsatisfactorily so that the braking member is not smoothly released. This drawback is significant especially in the case of a small video cassette because the above-described mechanism is smaller. If the brake member end piece 1a brakes or is bent, the locking function is lost, or the tape itself may be damaged.

SUMMARY OF INVENTION

Accordingly, an object of this invention is to eliminate the above-described difficulty in prior art locking devices.

The foregoing and other objects of the invention has been achieved by the provision of a magnetic tape cassette comprising: a pair of tape reels each having a peripheral portion provided with a gear, and a brake member for engaging with the gears to stop the reels. The brake member is slid by a tapered pin in which, according to the invention, the contact surfaces of the brake member and of a rib adapted to limit the upward movement of the brake member are inclined with respect to the bottom of the cassette in such a manner as to be wider in the reel braking releasing direction.

This invention will be described in greater detail with respect to the accompanying drawing and the description of the preferred embodiment that follows.

DESCRIPTION OF THE PREFERRED EMBODIMENTS

Figure 1:
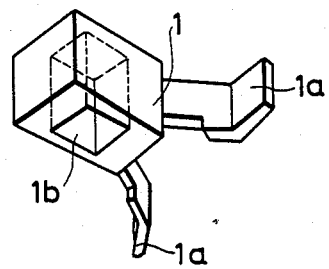
FIG. 1 is a perspective view of the brake member in a conventional magnetic tape cassette.
Figure 2:
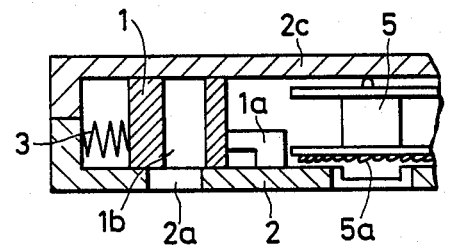
FIG. 2 is a sectional view showing a state of the brake member when the cassette is in storage (not in use)
Figure 3:
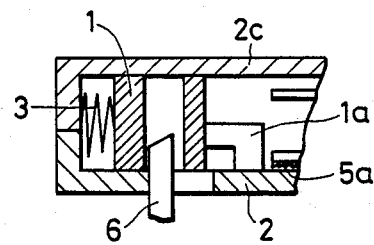
FIG. 3 is a sectional view showing another state of the brake member when the cassette is in use.
Figure 4:
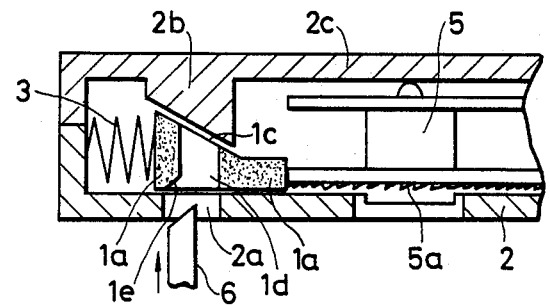
FIG. 4 is a sectional view showing one embodiment of this invention.

One embodiment of this invention will now be described with reference to FIG. 4. In FIG. 4, those same components which have been described with reference to FIGS. 1 through 3 are therefore designated by the same reference characters. FIG. 4 shows a state of a magnetic tape cassette when it is not in use.

As shown in FIG. 4, a brake member 1a is arranged in alignment with a brake releasing bar insertion hole 2a in the lower half 2 of the cassette. The brake member 1a may be made of a material different from that of the cassette. The upper surface of the brake member 1a is formed into a ramp surface 1c. A tapered rib 2b is formed on the inner wall of the upper half 2c of the cassette, having a ramp surface to mate with the ramp surface 1c. The brake member 1a is urged towards the reels 5 by the spring member 3, so that the reels 5 are locked by the end portions 1a of the brake member. The member 1a has a hole 1d aligned with hole 2a in the cassette. The hole 1d has a tapered wall portion 1e to displace the brake 1b as the bar moves upward.

The upper surface of the brake member 1a is formed with tapered surface 1c, while the tapered rib 2b is provided with a corresponding ramp surface. Accordingly, when the cassette is used, the tapered brake releasing bar 6 is inserted into the holes 2a and 1d. The brake member 1a smoothly slides away from the reels 5 guided by the tapered surface 1c in contact with the tapered rib 2b when the top of the bar 6 bears on surface 1e, that is, as the bar 6 moves upward member 1a moves to the left. Vertical movement is constrained at the ramp surface 1c.

In the magnetic tape cassette which is designed as described above, braking the reels can be positively and smoothly released.

We claim:

1. A magnetic tape cassette comprising a pair of tape reels each having a peripheral geared portion; a brake member for selectively engaging said gears to stop rotation of said reels; a tapered pin to actuate said brake member; an internal contact ramp surface disposed in said cassette to limit upward movement of said brake member, said brake member having a contact ramp compatible with said internal contact ramp surface and inclined with respect to the bottom of said cassette to be tapered toward a reel braking releasing direction.

2. The magnetic tape cassette of claim 1, wherein said cassette has an opening for said tapered pin to pass through and engage said brake member and said braking member has a through hole with an internal tapered surface for engaging said tapered pin and moving said brake member in a brake unlocking direction.

3. The magnetic tape cassette of claim 2, wherein said tapered surface in said through hole matches the taper on said pin.

4. The magnetic tape cassette of claim 1, wherein said braking member comprises a pair of angularly spaced arms, each of said arms having an end portion engaging said geared portion of a reel.

5. The magnetic tape cassette of claim 1, further comprising spring means to urge said brake member into engagement with said gear portion of a reel.

6. The magnetic tape cassette of claim 1 wherein said cassette has upper and lower portions and said internal contact ramp surface is an integral part of said cassette upper portion.

* * * * *